United States Patent
Billman et al.

(10) Patent No.: US 9,065,260 B2
(45) Date of Patent: Jun. 23, 2015

(54) MODULAR ELECTRIC POWER DISTRIBUTION SYSTEM

(71) Applicant: Phoenix Contact Development & Manufacturing, Inc., Middletown, PA (US)

(72) Inventors: Timothy Brian Billman, Dover, PA (US); Scott Anthony Faulkner, Harrisburg, PA (US); Shane Wiest, Shermans Dale, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 216 days.

(21) Appl. No.: 13/836,257

(22) Filed: Mar. 15, 2013

(65) Prior Publication Data

US 2014/0158395 A1   Jun. 12, 2014

Related U.S. Application Data

(60) Provisional application No. 61/734,006, filed on Dec. 6, 2012.

(51) Int. Cl.
| | |
|---|---|
| *H01R 13/46* | (2006.01) |
| *H02G 5/02* | (2006.01) |
| *H01R 13/514* | (2006.01) |
| *H01R 9/26* | (2006.01) |
| *H01R 31/08* | (2006.01) |

(Continued)

(52) U.S. Cl.
CPC ............... *H02G 5/02* (2013.01); *H01R 13/514* (2013.01); *H01R 9/2675* (2013.01); *H01R 31/085* (2013.01); *H01R 13/627* (2013.01); *H01R 9/2458* (2013.01); *H01R 13/18* (2013.01); *H01R 31/02* (2013.01); *H01R 31/06* (2013.01); *H01R 31/08* (2013.01)

(58) Field of Classification Search
CPC .......... H02G 5/08; H01R 23/02; H01R 13/66; H01R 13/6658; H01R 13/514; H01R 31/085; H01R 9/2675
USPC ............. 174/59, 145, 68.2, 72 B, 70 B, 99 B, 174/149 B; 439/249, 620.01, 839, 856, 857, 439/861, 682
See application file for complete search history.

(56) References Cited

U.S. PATENT DOCUMENTS

| | | |
|---|---|---|
| 3,990,767 A | 11/1976 | Narozny |
| 4,190,952 A | 3/1980 | Thomas et al. |

(Continued)

FOREIGN PATENT DOCUMENTS

| | | |
|---|---|---|
| DE | 102011076377 A1 | 11/2012 |
| EP | 1291977 A2 | 3/2003 |

(Continued)

OTHER PUBLICATIONS

European Patent Office, International Search Report in corresponding PCT/EP2013/075697, Apr. 30, 2014, 18 pages.

*Primary Examiner* — Hoa C Nguyen
*Assistant Examiner* — Binh Tran
(74) *Attorney, Agent, or Firm* — Hooker & Habib, P.C.

(57) ABSTRACT

A modular electric power distribution system transmits power between a power source and control modules for power consumers. The system includes a power distribution unit mounted on each module and bridge assemblies which connect adjacent distribution units.

23 Claims, 7 Drawing Sheets

(51) Int. Cl.
*H01R 13/627* (2006.01)
*H01R 9/24* (2006.01)
*H01R 13/18* (2006.01)
*H01R 31/02* (2006.01)
*H01R 31/06* (2006.01)
H01B 17/00 (2006.01)
H01R 13/66 (2006.01)
H01R 13/64 (2006.01)

(56) References Cited

U.S. PATENT DOCUMENTS

| | | | |
|---|---|---|---|
| 4,428,637 A | 1/1984 | Worth | |
| 4,430,524 A | 2/1984 | Santucci | |
| 4,464,002 A | 8/1984 | Suzuki et al. | |
| 4,470,655 A | 9/1984 | Kalka et al. | |
| 4,588,240 A | 5/1986 | Ruehl et al. | |
| 4,773,867 A | 9/1988 | Keller et al. | |
| 4,883,430 A | 11/1989 | Siemon et al. | |
| 4,891,020 A | 1/1990 | Dunn | |
| 4,932,877 A | 6/1990 | Zinn | |
| 6,722,926 B2 | 4/2004 | Chevassus-More | |
| 7,892,050 B2 | 2/2011 | Pavlovic et al. | |
| 8,585,422 B2 | 11/2013 | Balcerak et al. | |
| 2007/0297110 A1 | 12/2007 | Scott | |
| 2009/0047814 A1 | 2/2009 | Daamen | |
| 2009/0309689 A1 | 12/2009 | Pavlovic et al. | |
| 2010/0311286 A1 | 12/2010 | Schrader | |
| 2012/0171889 A1 | 7/2012 | Gong et al. | |
| 2012/0264317 A1* | 10/2012 | Balcerak et al. | 439/212 |

FOREIGN PATENT DOCUMENTS

| | | |
|---|---|---|
| EP | 1837887 A1 | 9/2007 |
| EP | 1921715 A2 | 5/2008 |
| FR | 2844105 A1 | 3/2004 |
| WO | 03047059 A1 | 6/2003 |
| WO | 2004021521 A1 | 3/2004 |

\* cited by examiner

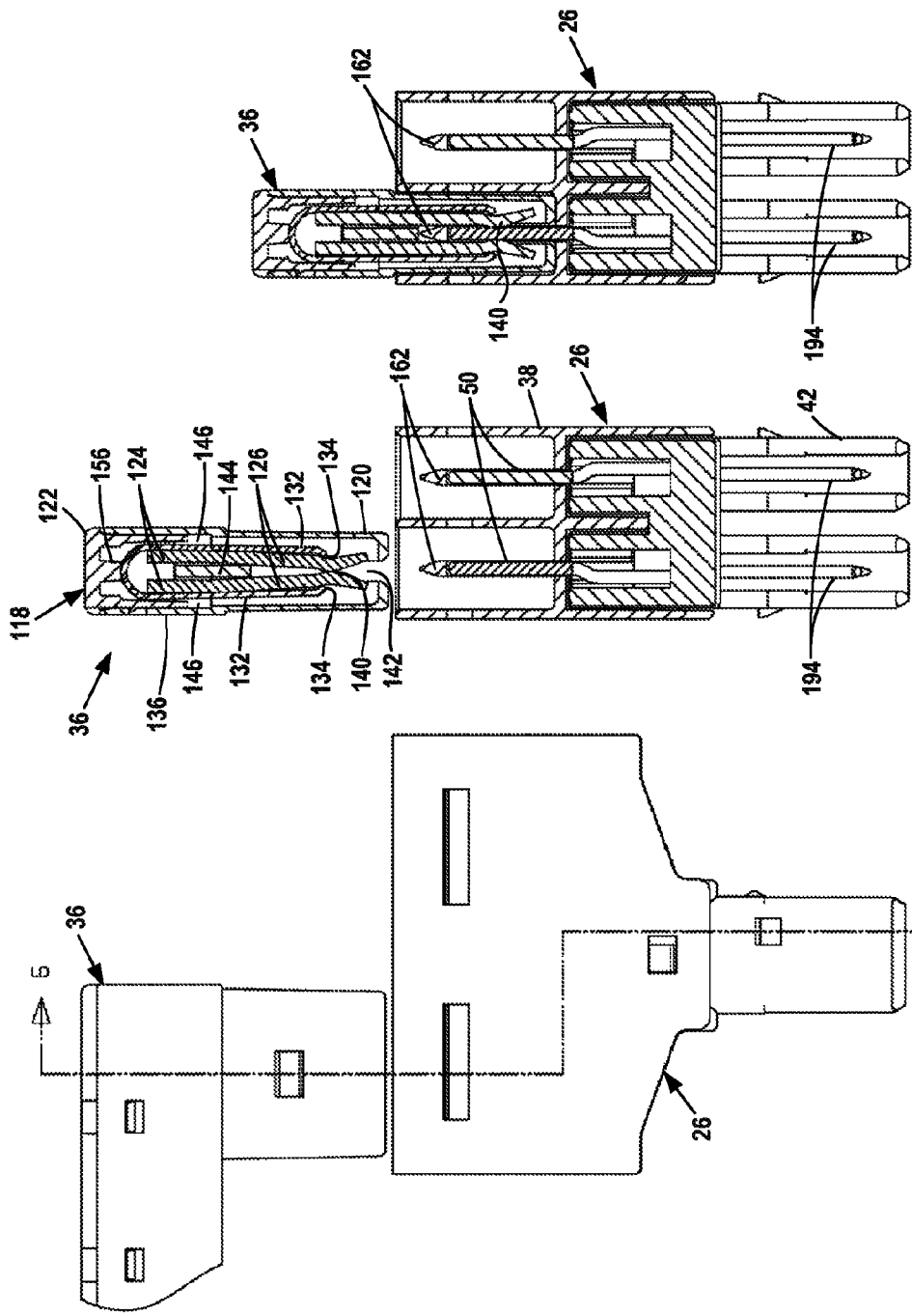

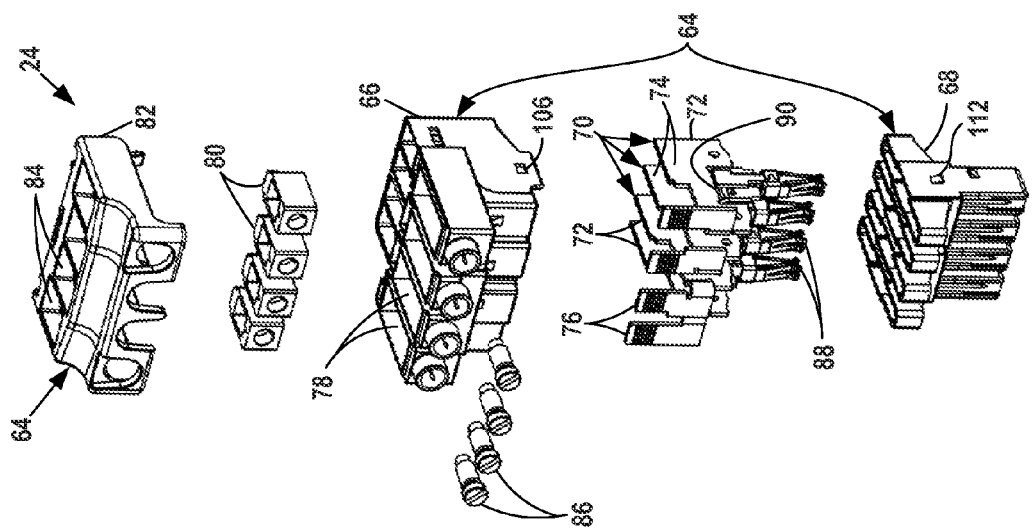
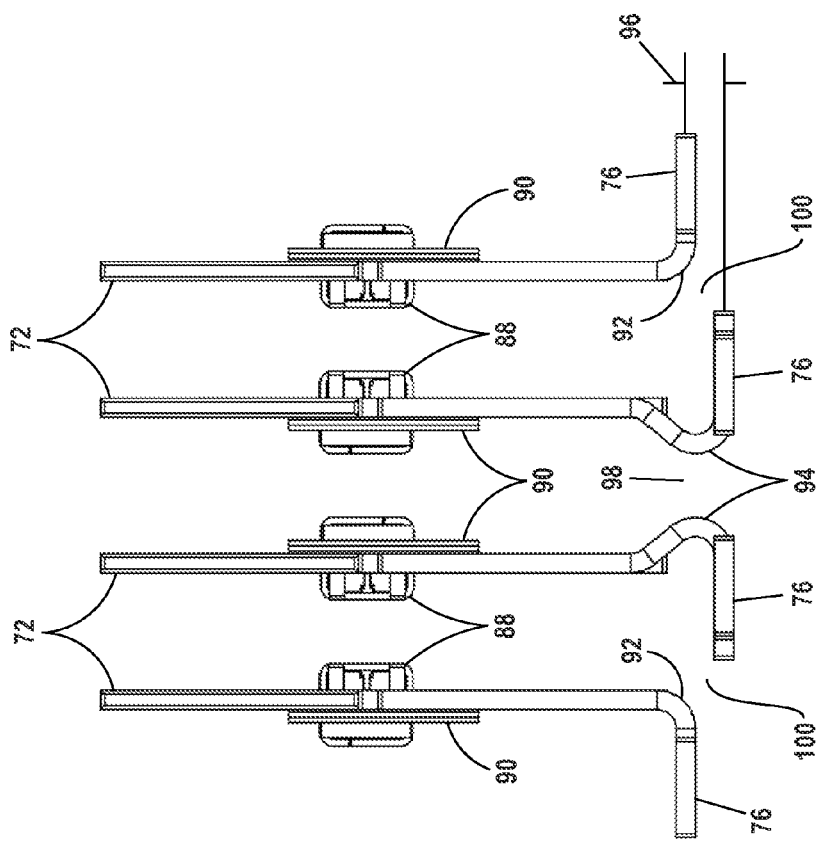

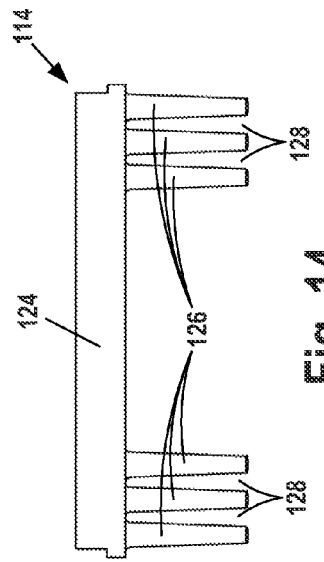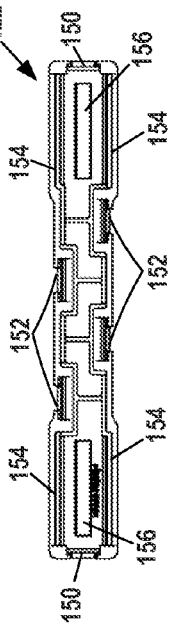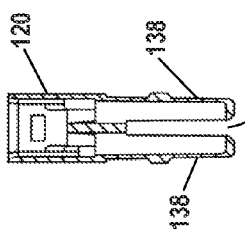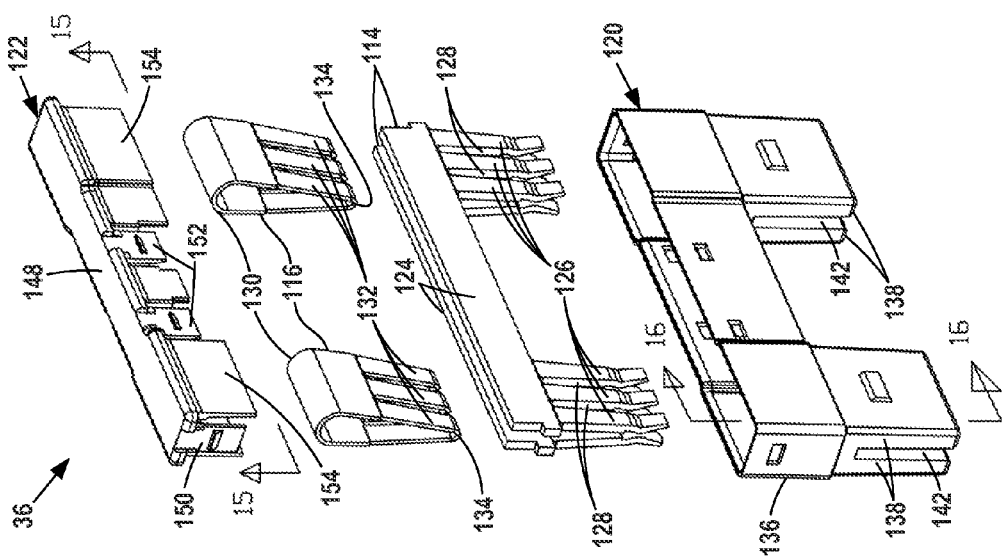

MODULAR ELECTRIC POWER DISTRIBUTION SYSTEM

FIELD OF THE DISCLOSURE

The disclosure relates to a modular electric power distribution system for transmitting electric power between a power source and control modules for power consumers, which may be electric step motors. Power is transmitted in response to input signals received by circuitry in the control modules. A number of types of electric power may be transmitted between the power source and the modules. Each type of power is distributed to the modules depending upon the needs of power consumers controlled by the modules. Power may be transmitted from a power consumer back into the distribution system.

BACKGROUND OF THE DISCLOSURE

Electric power control modules supply power to step motors in response to input signals received by the modules. Each module may supply a number of different types of power. Conventionally, each module is connected to a power source by heavy-duty power cables. Two cables are required for each type of power supplied to a module. Each module includes a header connector which mates with a plug connector mounted on the ends of each pair of power cables supplying a type of electric power to the module. A number of power control modules are positioned together to facilitate connecting the modules to the power source and inspection and servicing of the modules.

However, connecting each module to the power source using pairs of heavy-duty cables for each required type of electric power is difficult, expensive and inconvenient. Sets of different length power cables must be cut, terminated and connected to the modules and to the power source. The large number of cables must be properly routed between the power source and the control modules. This is a time-consuming and expensive process. Servicing the cables and modules can be difficult.

Contact members on adjacent modules are connected by high voltage, high amperage bridge assemblies using one-piece copper conductors. These bridge assemblies have long conductor strips with copper U-bends at the strip ends. The U-bends hold the copper strips on the contact members.

High amperage current flowed through conventional bridge assemblies can heat and weaken the copper U-bends sufficiently to reduce contact pressure between the conductor strips and the contact members. This can reduce current flow between modules.

Accordingly, there is a need for an improved modular power distribution system which efficiently connects a power source to a number of control modules without having to connect a pair of cables from the source to each module for each type of power supplied to the module. The improved system should include pairs of modular power conductors extending between modules. The pairs of conductors for each type of power should be connected to the power source by power cables extending to a first or end module only and should be connected to additional modules by pairs of series-oriented conductors having modular distribution units and bridge assemblies connecting adjacent distribution units. The distribution units should be removably mounted on the control modules, and the bridge assemblies should be easily and removably mounted on the distribution units to facilitate installation and servicing.

There is also a need for an improved bridge assembly with copper conductors and heat-resistant springs which hold the copper conductors against contact elements on the modules so that current heating of the conductors does not impair the springs and does not reduce current flow.

SUMMARY OF THE DISCLOSURE

One aspect of the disclosure is a modular electric power distribution system for connecting a power source to a number of control modules for electric devices. The electric devices may be electric step motors or other types of electric devices.

Each control module requires one or more types of power supplied by the power source. The types of power include AC and DC power and power having different voltages and amperages. The modules may require up to 300 or higher amps at a voltage as high as 600 or more volts. A pair of power cables for each type of power extends from the power source to an end control module. Pairs of conductors for each type of power extend from the end module to the other modules. Each conductor includes a power distribution unit on each control module and bridge assemblies extending between adjacent distribution units. The power distribution units are connected to power contacts in the control modules.

Each type of power is transmitted from the source through the two power cables and along the distribution units and the bridge assemblies to the control modules. Each module draws or returns power as required. Different length bridge assemblies connect control modules which are spaced apart different distances.

The distribution system can connect electric components other than control modules for step motors.

Another aspect of the disclosure relates to an improved bridge assembly for forming electrical connections between distribution units on adjacent control modules. The bridge assembly may be used to connect other types of electric power components.

Each bridge assembly includes an insulating housing, two high-current bridge conductors and two spring clips in the housing. The conductors are made of highly conductive metal, which may be copper, with contacts at the ends of the conductors for forming electrical connections with distribution units or other components. The spring clips are made from heat-resistant metal, surround the contacts at the ends of the two bridge conductors and hold the conductors against plates in two distribution units to provide reliable, low insertion force mounting on the distribution units. The two conductors form two reliable electrical connections between the distribution units. The conductors and springs in each bridge assembly are mounted in the insulated housing to form a one-piece assembly and to prevent arcing to adjacent components and to prevent inadvertent contact by a technician. Resistance heating of the spring clips does not reduce contact pressure.

A further aspect of the disclosure relates to an improved power distribution unit for mounting on a control module and forming electrical connections between a power source, circuitry in the module and bridge assemblies extending to other modules. The distribution unit includes upper level conductive plates with one or two upper bridge contact portions, a single lower level module contact, and an insulating body. Distribution units are removably mounted on control modules by extending the lower level module contacts into the control modules for electrical connection with circuitry in the modules. The ends of bridge assemblies engage upper level contact portions to form part of an elongate power conductor extending past a number of control modules. A pair of conductors with distribution units and bridge assemblies supplies one type of power to a number of control modules.

The lower level module contacts in the distribution members may be closely spaced to engage closely spaced power contacts in control modules. The upper level bridge contact portions in the distribution members may be widely spaced to engage relatively wide bridge assemblies. The width of the bridge assemblies is determined by the spacing between bridge connectors in the assemblies, springs surrounding the contact ends of the bridge connectors, and an insulating housing surrounding the connectors and springs.

The distribution members in the distribution units with closely spaced module contacts may include widely spaced upper plates and lateral steps between the module contacts and the plates. The plates engage the ends of the bridge assemblies from lower module contacts which engage power contacts in the modules. The upper and lower portions of the distribution members are fitted in an insulating housing.

The upper level bridge contact portions may be spaced apart the same distance as the lower level contacts are spaced apart or may be spaced apart a greater or smaller distance than the lower level contacts, depending upon the requirements of a particular distribution system. When the spacing is different, distribution members may include lateral shift steps to provided offsets. The amount of offset in individual distribution members may increase across the distribution unit to space the upper portions evenly for engagement with evenly spaced bridge assemblies and to space the module contacts evenly for engagement with evenly spaced power contacts.

DESCRIPTION OF THE DRAWINGS

FIG. 5 is a side view of a bridge assembly above a power distribution unit showing an alternative distribution unit;
FIG. 6 is a sectional view taken along line 6-6 of FIG. 5;
FIG. 7 is a sectional view similar to FIG. 6 showing the bridge assembly engaging the distribution unit;
FIG. 8 is an exploded view of an end power distribution unit;
FIG. 9 is a top view of power distribution members in the distribution unit of FIG. 8;
FIG. 13 is an exploded view of a bridge assembly;
FIG. 14 is a side view of a power conductor used in a bridge assembly;
FIG. 15 is a bottom view of a cover taking the direction of line 15-15 of FIG. 13; and,
FIG. 16 is a sectional view taken along line 16-16 of FIG. 13.

DESCRIPTION OF THE PREFERRED EMBODIMENTS

Figure 1:
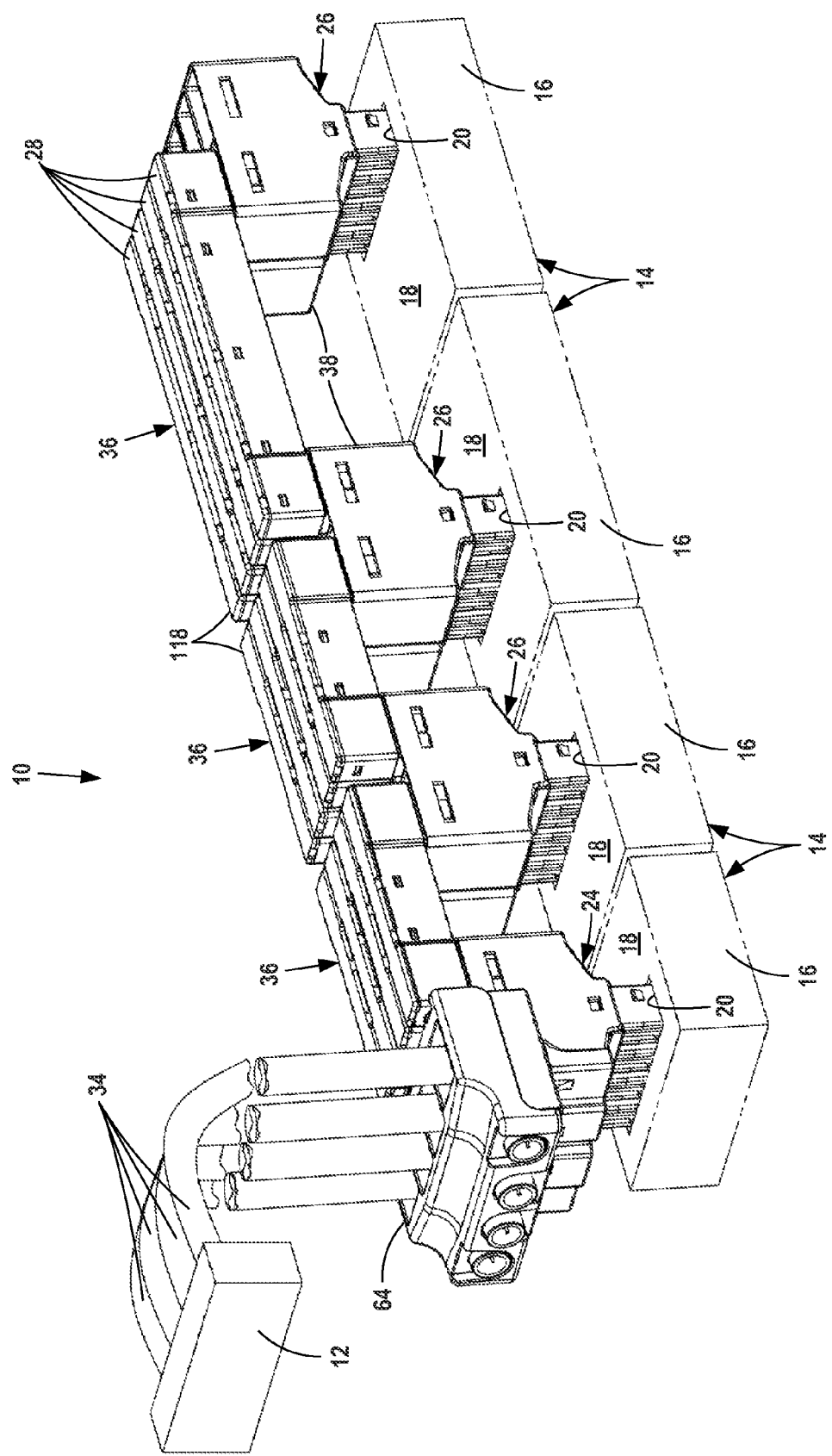
FIG. 1 is a perspective view of a modular electric power distribution system.
Figure 2:
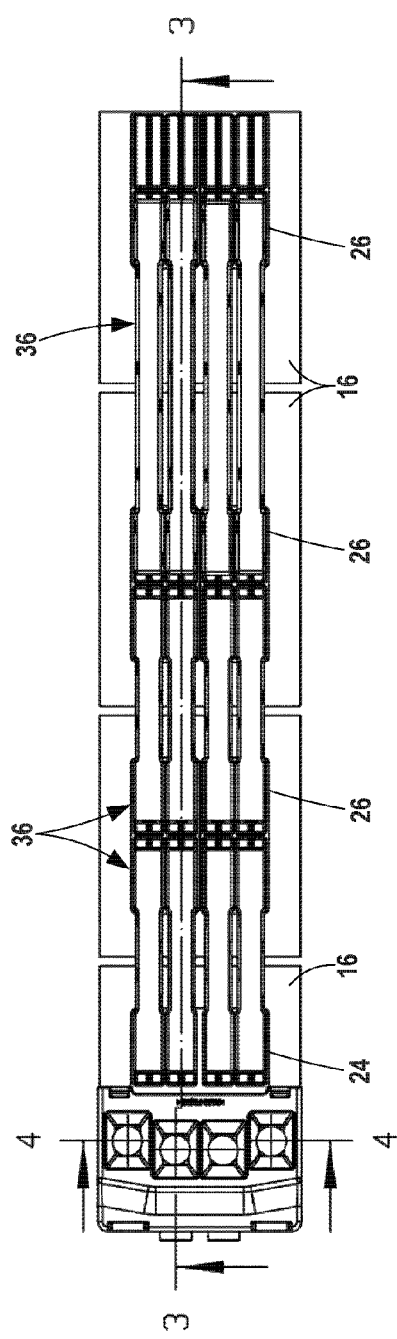
FIG. 2 is a top view of FIG. 1.

FIG. 1 illustrates a modular electric power distribution system 10. The FIG. 1 system forms two conductor electrical connections between an electric power source 12 and four or more control modules 14. Each control module includes a rectangular body 16 with a top surface 18 and a mounting opening 20 formed in top surface 18. The openings 20 are aligned in a row on surfaces 18. Power contacts 22 are located in modules 14 below openings 20 for forming electrical connections with contacts in the lower portions of power distribution units 24 and 26 which extend into openings 20.

Each control module 14 is connected to an electric step motor or other power consumer. The module includes an actuator circuit which determines when power is required to be supplied to the step motor or consumer, or when power from the step motor or consumer is returned back to system 10. The components of modules 14 and the actuator circuits are not illustrated.

The power distribution system 10 includes pairs of elongate power conductors 28 extending across the tops of modules 14. In FIG. 1, the system includes four conductors 28 to communicate two types of electric power between the source 12 and the modules. Two conductors 28 are required for each type of power distributed by system 10. The system 10 uses as many pairs of conductors 28 as required to supply needed types of power to and receive power from the control modules.

Power may be AC or DC and may be supplied at high amperage which may be as great as 100 amperes. The power may have a voltage as high as 600 volts.

Each conductor 28 passes through an end power distribution unit 24 mounted on end module 14 and a number of like power distribution units 26 mounted on other modules 14. Each conductor 28 also includes a number of bridge assemblies 36 which connect adjacent pairs of power distribution units 24 and 26. End unit 24 on end module 14 is connected to power source 12 by heavy-duty, high amperage and high voltage power cables 34. In FIG. 1, units 24 and 26 are shown partially inserted into modules 14.

The conductors 28 are connected to source 12, extend through distribution units 24 and 26 on the modules and through bridge assemblies 36 between modules. Each distribution unit is connected to a power contact 22 in a module. Adjacent pairs of conductors 28 supply one type of power to the modules and can receive the same type of power back from the modules.

Each power distribution unit 26 includes an insulated body with molded plastic upper contact housing 40 latched onto molded plastic lower contact housing 42. See FIG. 10. Metal power distribution members 44 are fitted in recesses 46 in the upper plate housing 40 and in recesses 48 in the lower contact housing 42. Each member 44 includes a flat, thick upper plate 50, a central thick lower plate 52, a lateral shift step 54 between the plates and a disconnect pin or module contact 56 on the bottom of the plate 52. The plates are formed from copper to conduct high amperage current. In some units, steps 54 may not be used so that the upper and lower plates are aligned.

Recesses 46 are spaced across the upper contact housing 40 for plates 50, and recesses 48 are spaced across in housing 42 for plates 52. Recesses 46 in upper plate housing 40 have a width sufficient to receive the relatively wide ends of the bridge assemblies 36 and form electrical connections with a pair of power conductors in each bridge assembly. A central opening 58 is provided in housing 42 at the bottom of each recess 48.

The top of each upper plate 50 includes upper contact portion 60 with contact surfaces 61 on both sides of portions 60. The contact portions 60 are located on opposite plate ends for forming electrical connections with bridge assemblies 36 extending between adjacent distribution units. The distribution members 44 are formed from thick copper plate stock for reliable flow of high amperage and high voltage current through distribution system 10.

Power contact 56 on lower plate 52 is fitted in a recess in the bottom of lower housing 42 above opening 58. The power contacts 56 are spaced closer together than upper plates 50 in the upper and lower housings. The different spacing is achieved by lateral shift or offset steps 54 between plates 50 and 52. The contacts 56 are mounted on one side of lower plate 52. The offset steps 54 and offset contacts 56 assure that upper plates 60 are uniformly spaced to fit in recesses 46 and 48 and that contacts 56 are uniformly spaced, closer together than plates 50, and fit in the bottoms of recesses 48. The upper portions of recesses 48 are spaced to receive the lower portions of upper plates 50 and are laterally offset from the bottoms of the recesses which receive the lower plates 52 and offset contacts 56.

Offsets or steps 54 on the two members 44 on one side of unit 32 locate contacts 56 closer to the center of the housing than upper plates 50. The offsets 54 on the two members 44 on the other side of unit 26 also locate the contacts 56 closer to the center of the housing than plates 50. Plates 50 are uniformly spaced, and the contacts 56 are uniformly spaced. This means that the offsets for the inner distribution members are smaller than the offsets for the outer distribution members 44. The outer two distribution members 44 are identical but are rotated 180°, and the inner two distribution members 44 are identical but are rotated 180° to provide desired uniform spacing of the contacts 56 and uniform but wide spacing of plates 50.

Figure 10:
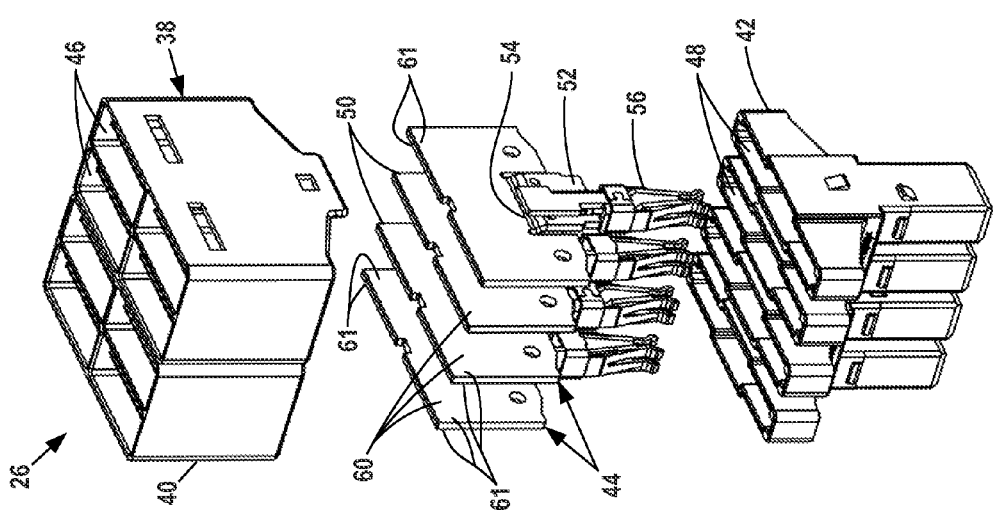

Steps 54 shown in FIG. 10 extend horizontally across members 44. If desired, contacts 56 may be mounted on offset cut-out lower plates in members 44 which are connected to the upper plates by vertically extending lateral shift steps.

The power contacts 56 illustrated in distribution unit 26 may be mounted on either side of the offset lower plates 52 of members 44 to provide lateral shift.

Distribution units 26 have four power distribution members 44 with a horizontal lateral shift step in each member 44. The steps space plates 50 from contacts 56. Alternatively, a power distribution unit may have one flat center distribution member 44 without a lateral shift step. The plate 50 for the center member 44 would extend above a central contact 56, without a lateral shift step. The plates 50 of the member 44 on one side of the center member would have an outer lateral shift step, as described. The plates 50 of the member on the other side of the center member would have an outer lateral shift step as described, and the members outside these members would have outer lateral shift steps greater than those of the adjacent members in order to maintain uniform spacing between plates 50 and uniform but closer spacing of the contacts 56 at the bottoms of the plates.

If desired, a distribution unit may have a side power distribution member without a lateral shift step and progressively greater lateral shift steps in members to one side of the no-shift member.

Figure 8A:
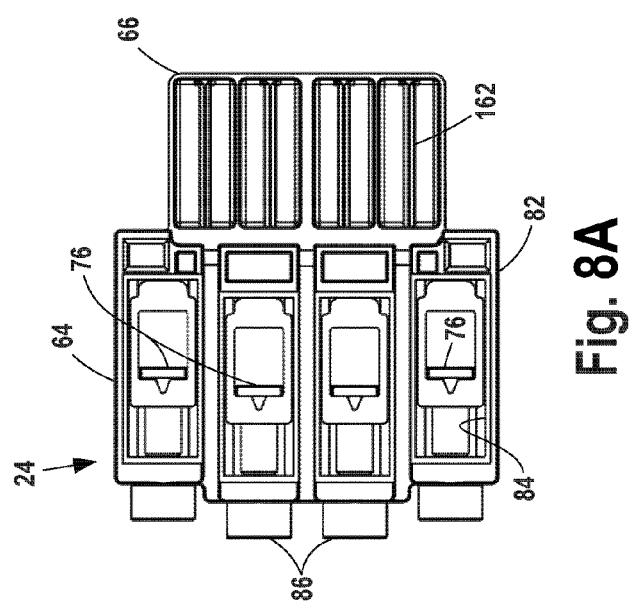
FIG. 8A is a top view of the power distribution unit shown in FIG. 8.
Figure 3:
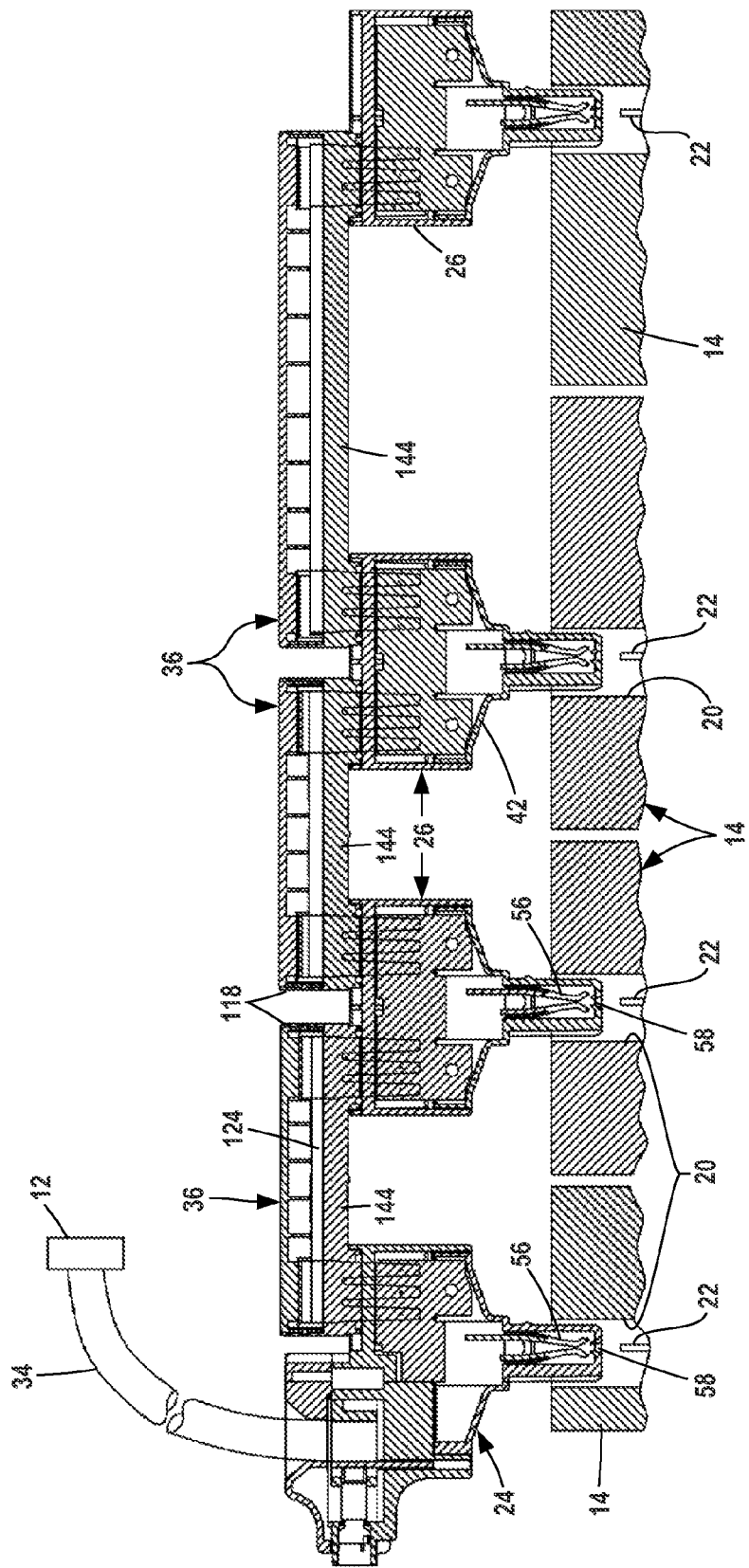
FIG. 3 is a sectional view taken along line 3-3 of FIG. 2.

FIG. 8 is an exploded view of end power distribution unit 24, and FIG. 8A is a top view of end power distribution unit 24. Unit 24 includes an insulating body 64 with upper plate housing 66 and lower contact housing 68. Four metal power distribution members 70 are positioned in the body. Members 70 are like previously described members 44 with the exception that each copper upper plate 72 includes opposed contact surfaces 74 at one plate end and a vertically extending power contact tab 76 at the opposite end of the plate. The upper and lower housings 66 and 68 are similar to previously described housings 40 and 42 with the exception that side cavities 78 are provided in housing 66 to receive tabs 76 and cable clamps 80 fitted on the tabs. The clamps are seated in cavities 78 with tabs 76 extending through central openings of the clamps. Cover 82 is latched onto housing 66 over the cable clamps 80 and includes spaced cable insertion openings 84 above the clamps.

Stripped ends of power cables 34 are extended through the openings 84 in cover 82 and into the openings in the clamps. Electrical connections are formed between the power cables and the distribution members 70 by tightening clamp screws 86 which threadably engage the clamps. When each screw is tightened, a cable is clamped against a tab 76, and an electrical connection is formed between the cable and a member 70.

In power distribution unit 24, power contacts 88 on members 70 are located in recesses in the bottom of housings 68 and are spaced closer together than the plates 72 by lateral shift steps 90 in members 70, as previously described.

Tabs 76 and cable clamps 80 are wider than plates 72. The tabs 76 on the outermost plates 72 are connected to the plates by 90° outward bends 92 and extend outwardly from the plates. See FIG. 9. The tabs 76 on the inner two plates 72 are connected to the plates by 90° inward offset bends 94 and extend outwardly from the plates. The inner tabs 76 are spaced a distance 96 out from the ends of the plates 72, beyond the outer tabs 76, to provide increased clearance between inner and outer tabs. Comparable clearance 98 is provided between the inner tabs at bends 94. Clearances 100 are provided between inner tabs 76 and bends 92. Positioning the tabs and wire clamps in spaced, wide cavities 78 with clearances separates members 70 and allows the plastic walls between the members to prevent arcing or creepage discharge between adjacent members when high amperage and high voltage current is distributed by system 10. The plastic walls of insulating body 64 are not shown in FIG. 9. The bends 92 and 94 space the upwardly extending tabs 76 across unit 24 to fit in cavities 78.

Distribution members 70 are inserted into lower contact housing 68, following which upper plate housing 66 is positioned on housing 68 with plates 72 in plate recesses 108 and 110 and tabs 76 extending into cavities 78. The latch openings 106, on the ends of housing 66, snap around latch projections 112 to secure housings 66 and 68 together. The clamps 80 are fitted in cavities 78, and cover 82 is latched onto upper plate housing 66.

Figure 12:
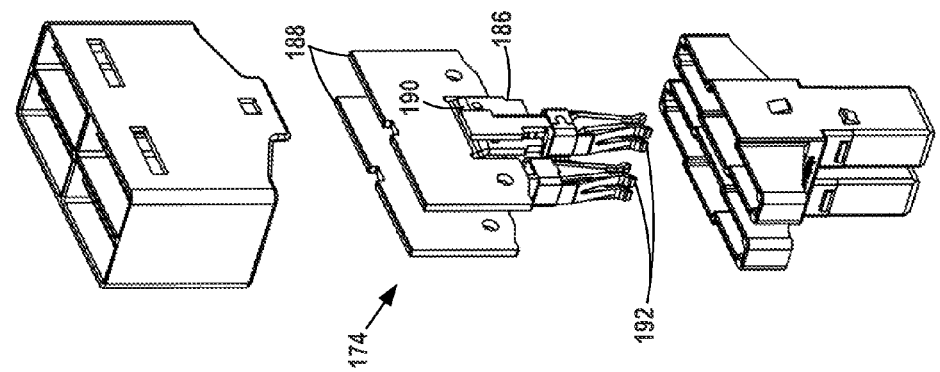
FIGS. 10, 11 and 12 are exploded views of power distribution units.
Figure 11:
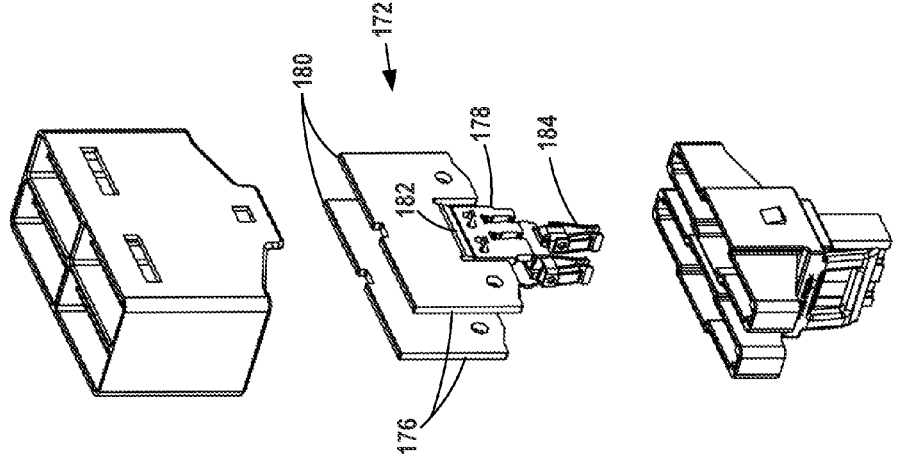

FIGS. 11 and 12 are exploded views of power distribution units 172 and 174, which are similar to unit 26. Each unit includes a two-piece insulating body with upper and lower contact housings like body 38. Each insulating body has interior recesses and surrounds two power distribution members.

In FIG. 11, power distribution members 176 are like members 44 with the exception that the lower plate portions 178 are located inwardly of the upper plate portions 180 by inward lateral shift steps 182. Module contacts 184 are mounted on the inner sides of lower plate portions 178.

In FIG. 12, the lower plate portions 186 are connected to upper plate portions 188 by outer, horizontal lateral steps 190, and the module contacts 192 are mounted on the inner sides of the lower portions, as in distribution unit 26 illustrated in FIG. 10.

Figure 4:
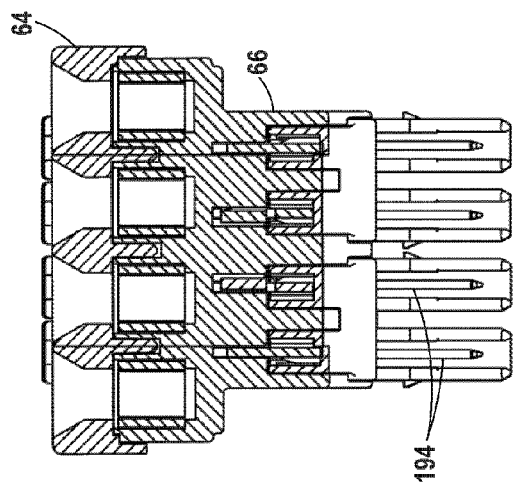
FIG. 4 is a sectional view taken along line 4-4 of FIG. 2.

In distribution units 24 and 26, the module contacts 56 and 88 are socket contacts and engage pin-type power contacts 22 in the modules. As illustrated in FIGS. 4, 6 and 7, socket contacts on the lower plate portions may be replaced by pin-type contacts to engage socket contacts in the modules.

FIG. 13 is an exploded view of a bridge assembly 36. Bridge assembly 36 includes two flat copper conductors 114, two stainless steel spring clips 116 which surround the ends of conductors 114, and a plastic housing 118, also shown in FIG. 1, which surrounds the conductors and clips. The housing 118 includes molded plastic housing base 120 and cover 122.

Each conductor 114 is formed from thick, conductive copper sheet stock and includes an elongate, flat conductor strip 124 extending along the length of assembly 36 with three contact arms 126 extending downwardly at 90° from each end of each conductive strip 124. Slots 128 separate adjacent arms 126.

Clips 116 are formed from flexible, heat-resistant stainless steel. Each clip includes U-shaped upper portion 130 with three spaced individual spring arms 132 extending downwardly from the lower end of each side of portion 130. The lower ends of arms 132 are bent inwardly to provide pressure ends 134 located inwardly from arms 132. See FIGS. 6 and 7. When clips 116 are positioned on the ends of conductor strips 124, ends 134 of spring arms 132 engage the lower ends of contact arms 126.

Plastic housing base 120 includes an elongate, circumferential wall or shell 136 which surrounds conductor strips 124 and top portions of clips 116. Base 120 includes two three-sided arm shields 138 at each end of wall 136. The open sides of shields 138 at each end of wall 136 face each other and partially surround contact arms 126 and spring arms 132 when the strips and clips are inserted into housing 118. Contact projections 140 are provided on the inner surfaces of the lower ends of contact arms 126.

Contact clips 116 are fitted on the ends of the two conductors 114 with each clip arm 132 overlying a contact arm 126, as illustrated in FIGS. 6 and 7. The spring arms 132 individually bias the contact arms 126 inwardly to form reliable individual electrical connections with the plates 50 and 72 in distribution units 24 and 26 when assemblies 36 are mounted on the units. Rectangular wall or shell 136 surrounds conductor strips 124. The three-sided shields 138 at each end of the shell 136 partially surround arms 126 and 132 while allowing each arm 126 to contact plates 50 and 72 in the distribution units. The shields and arms 126 and 132 are separated by central slots 142. Each slot receives a contact portion of a copper plate 50 or 72 when the bridge assembly is mounted on the distribution units. Three separate spring-backed and reliable electrical connections are formed between each conductor 114 and each plate 50, 72.

Housing base 120 includes a central bar 144, shown in FIGS. 6 and 7, which is located inside shell 136 and extends between the ends of the shell midway between the sides of the shell. Bar 144 is between two recesses 146, each located between the bar and one side of base 120. Conductor strips 124 and the sides of upper clip spring portions 130 are positioned in recesses 146.

Cover 122 includes elongate top wall 148 which closes the top opening in base 120. End lock tabs 150 extend downwardly from the ends of wall 148. Two side lock tabs 152 extend downwardly from the sides of wall 148 between a pair of side walls 154 at each end of top wall 148. A contact clip location projection 156 extends inwardly from each end of the top wall 148 between side walls 154. Projections 156 and walls 154 define recesses for locating strips 124 and portions 130 of contact clips 116 in housing 118.

Conductors 114, with clips 116 fitted around the ends of the conductors and spring arms 132 overlying contact arms 126, are positioned in base 120 with the upper ends of the spring arms and contact arms in recesses 146 and bar 144 separating conductors 114. Cover 122 is then latched onto base 120 with projections on end and side tabs 150, 152 latched into openings formed in shell 136. Contact arms 126 extend parallel to the sides of assembly 36, and conductor strips 124 fit between the clips 116 and bar 144. Spring clips 116 are not stressed. The conductors 114 are loosely confined in housing 118.

Modular electrical power distribution system 10 is installed on a number of side-by-side power control modules by extending an end power distribution unit 24 in opening 20 in an end module 14 and fitting power distribution units 26 in the openings in the remaining modules. Power contacts 56 on the units 24 and 26 make electrical connections with module contacts 22. Power cables 34 are secured to the power distribution members 70 in unit 24, as previously described.

Next, a pair of bridge assemblies 36 is mounted on adjacent distribution units 24, 26 for each type of power to be supplied to or received from modules 14, as illustrated in FIG. 1. The assemblies 36 may have different lengths in order to connect distribution units mounted on different width modules.

Bridge assemblies 36 connect adjacent units 24 and 26. Each conductor 114 in the assembly forms an electrical connection between the copper plates in the units independent of the other conductor. The arm shields 138 at each end of bridge assembly 36 extend into recesses 46, 108 so that shields 138, contact arms 126 and spring arms 132 are moved down and onto a plate. The thickness of the plate is greater than the rest spacing between contact projections 140. During insertion, the beveled lead ends 160 of arms 126 engage plastic guiderails 162 which overly top edges 164 of the copper plates in units 24 and 26. See FIGS. 6 and 7. Guiderails 162 extend between the end walls of the upper housings 40 and 66. The rails 162 are beveled and spread arms 126 apart for movement of contact projections 140 onto the plates in the distribution units. The conductors 114 rotate in housing 118 during insertion into the distribution units.

Spreading of arms 126 elastically flexes individual spring arms 132 outwardly to provide reliable, low-level contact pressure holding each projection 140 against the copper plates and forming three independent electrical connections between the plates and each end of each conductor 114. The guiderails 162 provide touch safety when a bridge assembly 3 is not installed.

During use of system 10, high voltage and high amperage current flows along the bridge assemblies 36 between adjacent distribution units. The current flow may be sufficient to increase the temperature of the copper conductors 114. The contact clips 116 are formed from a heat-resilient metal, which may be stainless steel, which does not lose its spring properties when heated by conductors 114. This means that heating of the conductors does not decrease the contact pressure between conductors 114 and the plates in the distribution units and does not impair current flow.

Conventional, high-current bridge assemblies use copper conductor strips which are joined together at the ends of the assemblies by integral copper U-bends. The U-bends hold the contacts at the ends of the assembly against inserted blades. High-current resistance heating of these conductors can heat and weaken the U-bends to undesirably reduce contact pressure with plates inserted between the ends of the conductors.

Each end of each conductor 114 is electrically connected to each plate by three independent electrical connections at contact projections 140. A separate spring arm 132 holds each contact arm against the plate at the connection so that possible degradation of one connection does not impair other connections.

Each conductor 114 in a bridge assembly 36 conducts electricity between two plates. Typically, each conductor conducts one-half of the electricity conducted by the assembly.

What we claim as our invention:

1. A power distribution system for transmitting electricity between power contacts in spaced first and second modules, the system comprising first and second power distribution units and a plurality of bridge assemblies extending between the power distribution units; each power distribution unit comprising a dielectric body, a plurality of electrically conductive distribution members in the dielectric body, each distribution member having a module contact at a first side of the dielectric body and a contact plate at a second side of the dielectric body, the contact plate comprising two opposed sides, each side comprising a contact surface, the first power distribution unit to be mounted on a first module with the module contact engaging a power contact in the first module, the second power distribution unit to be mounted on a second module with the module contact engaging a power contact in the second module; each bridge assembly comprising a dielectric housing, a first elongate conductive member in the dielectric housing, a second elongate conductive member in the dielectric housing, a first contact at each end of the first conductive member, a second contact at each end of the second conductive member, and openings in the housing adjacent such contacts; each bridge assembly removably mounted on the first and second power distribution units with a plate on the first power distribution unit extending through the opening at one end of the housing and one contact surface of the plate engaging an adjacent first contact on the first conductive member and the other contact surface of the plate engaging an adjacent second contact on the second conductive member, a plate on the second power distribution unit extending through the opening at the other end of the housing and one contact surface of the plate engaging an adjacent first contact on the first conductive member and the other contact surface of the plate engaging an adjacent second contact on the second conductive member, wherein the first and second conductive members of each bridge assembly and a distribution member in each distribution unit form an electrical connection between power contacts in the first and second modules.

2. The system as in claim 1 wherein the plates in each power distribution unit are flat and parallel to each other, and the plates are uniformly spaced apart, and the contacts are uniformly spaced apart.

3. The system as in claim 2 wherein the spacing of the plates is different than the spacing of the contacts.

4. The system as in claim 1 wherein one plate includes a lateral shift step.

5. The system as in claim 1 wherein one module contact is mounted on a side of a plate.

6. The system as in claim 1 wherein the first and second sides of each dielectric body are opposed to each other.

7. The system as in claim 1 wherein each plate includes first and second spaced contact portions and each bridge assembly contact engages a first plate contact portion, wherein the second plate contact portions are available for engagement by another bridge assembly.

8. The system as in claim 1 wherein each dielectric body includes a recess for each plate and a recess for the module contact on such plate, and one plate recess is laterally spaced from its associated contact opening.

9. A power distribution system for transmitting electricity between power contacts in spaced first and second modules, the system comprising first and second power distribution units and a plurality of bridge assemblies extending between the power distribution units; each power distribution unit comprising a dielectric body, a plurality of electrically conductive distribution members in the dielectric body, each distribution member having a module contact at a first side of the dielectric body and a contact plate at a second side of the dielectric body, the first power distribution unit to be mounted on a first module with the module contact engaging a power contact in the first module, the second power distribution unit to be mounted on a second module with the module contact engaging a power contact in the second module; each bridge assembly comprising a dielectric housing, a first elongate conductive member in the dielectric housing, a first contact at each end of the conductive member, and openings in the housing adjacent such contacts; each bridge assembly removably mounted on the first and second power distribution units with a plate on the first power distribution unit extending through the opening at one end of the housing and engaging an adjacent contact on the conductive member and a plate on the second power distribution unit extending through the opening at the other end of the housing and engaging an adjacent contact on the conductive member, wherein each bridge assembly and a distribution member in each distribution unit form an electrical connection between power contacts in the first and second modules, and wherein each bridge assembly includes a heat-resistant spring in the housing at each contact, wherein each spring biases a contact against a plate to maintain an electrical connection therebetween essentially independent of the temperature of the conductive member in the housing.

10. The system as in claim 9 wherein each bridge assembly comprises a second elongate conductive member extending along the first elongate conductive member, the second elongate conductive member including a second contact at each end thereof; and, two heat-resistant clips surrounding the ends of the first and second elongate conductive members, each clip having resilient arms engaging the conductive members to bias the contacts against a plate between the contacts.

11. The power distribution system as in claim 10 wherein each elongate conductive member includes a plurality of contact arms at each end thereof, each clip surrounding the conductive members and engaging the arms.

12. The system as in claim 11 wherein each distribution unit dielectric body includes a guard rail overlying each plate, each guard rail between the elongate conductive members.

13. A power distribution system for transmitting electricity between a power source and power contacts in a plurality of modules, the system comprising a power distribution unit associated with each module and a plurality of bridge assemblies extending between adjacent power distribution units; each power distribution unit comprising a dielectric body and a plurality of electrically conductive distribution members in the dielectric body, each distribution member including a plate away from the associated module and a module contact engaging a power contact in the associated module, said plates extending parallel to each other, each plate including opposite sides with a first contact surface on one side and a second contact surface on the other side; two bridge assemblies extending between pairs of power distribution units on adjacent modules, each bridge assembly including a dielectric housing, first and second elongate conductors in the housing, a pair of first contacts at the ends of the first elongate conductor, and a pair of second contacts at the ends of the second elongate conductor, each first contact engaging a first contact surface and each second contact engaging a second contact surface to form electrical connections between adjacent distribution units.

14. The power distribution system as in claim 13 wherein the spacing between the plates in one distribution unit is different than the spacing between the module contacts in the distribution unit.

15. The power distribution system as in claim 14 wherein the plate of each distribution member has opposite sides spaced laterally from each other, the module contact of such distribution member spaced laterally from the plate.

16. The power distribution system as in claim 13 including a guard rail over each plate.

17. A power distribution system for transmitting electricity between a power source and power contacts in a plurality of modules, the system comprising a power distribution unit associated with each module and a plurality of bridge assemblies extending between adjacent power distribution units; each power distribution unit comprising a dielectric body and a plurality of electrically conductive distribution members in the dielectric body, each distribution member including a plate away from the associated module and a module contact engaging a power contact in the associated module, said plates extending parallel to each other, each plate including spaced contact surfaces; two bridge assemblies extending between pairs of power distribution units on adjacent modules, each bridge assembly including a dielectric housing and a first elongate conductor in the housing, and a pair of contacts at the ends of the elongate conductor, each contact engaging a contact surface to form electrical connections between adjacent distribution units, and wherein each bridge assembly includes a second elongate conductor in the dielectric housing with a pair of contacts on the ends of the second elongate conductor, said elongate conductors formed from highly conductive metal, and including a pair of heat-resistant spring clips, each spring clip surrounding each end of said elongate conductor to bias the contacts against distribution member plates inserted therebetween.

18. The power distribution system as in claim 17 including a plurality of contact arms at each end of each elongate conductor and a plurality of spring arms at each side of each clip, said spring arms overlying said contact arms to individually bias the contact arms against the plates.

19. A power distribution system for transmitting electricity between a power source and power contacts in a plurality of modules, the system comprising a power distribution unit associated with each module and a plurality of bridge assemblies extending between adjacent power distribution units; each power distribution unit comprising a dielectric body and a plurality of electrically conductive distribution members in the dielectric body, each distribution member including a plate away from the associated module and a module contact engaging a power contact in the associated module, said plates extending parallel to each other, each plate including spaced contact surfaces; two bridge assemblies extending between pairs of power distribution units on adjacent modules, each bridge assembly including a dielectric housing and a first elongate conductor in the housing, and a pair of contacts at the ends of the elongate conductor, each contact engaging a contact surface to form electrical connections between adjacent distribution units, and wherein one power distribution unit includes cable contacts on the plates thereof for engaging power cables connected to a power source.

20. The power distribution system as in claim 19 wherein each cable contact includes a contact tab and a cable clamp for securing a conductor of a power cable against the tab.

21. The power distribution system as in claim 20 including 90° bends between said plates and said tabs.

22. The power distribution system as in claim 21 wherein one bend is an outward bend.

23. The power distribution system as in claim 21 wherein said bend includes an inward bend.

* * * * *